United States Patent [19]

Tallon

[11] Patent Number: 5,165,199

[45] Date of Patent: * Nov. 24, 1992

[54] NON-TOXIC METHOD OF EXTERMINATING INSECTS

[76] Inventor: Joseph C. Tallon, 206 S. Guadalupe St., Redondo Beach, Calif. 90277

[ * ] Notice: The portion of the term of this patent subsequent to Jul. 2, 2008 has been disclaimed.

[21] Appl. No.: 690,809

[22] Filed: Apr. 23, 1991

Related U.S. Application Data

[62] Division of Ser. No. 337,391, Apr. 13, 1989, Pat. No. 5,027,546.

[51] Int. Cl.⁵ ............................................. A01M 1/24
[52] U.S. Cl. ...................................... 43/124; 43/132.1
[58] Field of Search ............................... 43/124, 132.1

[56] References Cited

U.S. PATENT DOCUMENTS

| | | | |
|---|---|---|---|
| 4,160,336 | 7/1979 | Query | 43/124 |
| 4,322,910 | 4/1982 | Garbo | 56/1 |
| 4,597,217 | 7/1986 | Narita | 43/124 |
| 4,637,161 | 1/1987 | Turner | 43/132.1 |
| 4,640,044 | 2/1987 | Varon | 43/132.1 |
| 4,768,306 | 9/1988 | Hilbun | 43/132.1 |
| 4,833,818 | 5/1989 | Berta | 43/124 |

Primary Examiner—Kurt C. Rowan
Attorney, Agent, or Firm—Bernard L. Kleinke; Jerry R. Potts; William Patrick Waters

[57] ABSTRACT

This invention concerns a non-toxic method of exterminating dry wood termites, fleas, roaches, ants, weevils and the like by utilizing an inert freezing liquid such as liquid nitrogen as the killing agent. The liquid nitrogen is inserted so as to envelop the colony of objectionable organisms until the environment is reduced to a temperature of at least zero degrees Fahrenheit and maintained at that temperature for between 2 to 5 minutes. This method effectively kills the organisms by crystalizing the innards and freezing the cells, thereby eliminating the need for more dangerous and toxic poisons that are currently being used.

5 Claims, 2 Drawing Sheets

NON-TOXIC METHOD OF EXTERMINATING INSECTS

This is a continuation, of application Ser. No. 07/337,391, filed on Apr. 13, 1989 now 5,027,546.

This invention is concerned with a non-toxic method of exterminating undesirable insects and more particularly with the use of an inert freezing liquid for destroying organisms defined as insects, termites, and rodents.

In the exterminating field as practiced today, it is necessary to inspect a dwelling prior to sale in order to ensure there is no infestation of termites or other objectionable organisms.

In the art as practiced today there are many well known techniques for inspecting a dwelling to locate termites and discover the presence of termites. These include visual inspection, acoustic techniques and fiber optics which are successful in determining the location of colonies of termites that should be removed and exterminated.

Before a structure can be sold most lending agencies require the seller request a termite inspection from approved practitioners in the field who are licensed by the governing authorities to make these inspections and to use certain chemicals and other means to eradicate the undesirable termites.

Dry wood termites by their nature congregate in colonies that vary from approximately 2 to 1000 individuals and in which the colony exists in an area that may vary from one to four feet in length in a given location.

In an open area such as a garage the location of the termites can be found by a visual inspection of the exposed beams and by examining the debris left by the that may move slowly down a board but not place to place as a roach. In the usual case, inspection of the premises will usually show more than one colony of termites in a given area and in a typical case may include say 1 to 10 separate colonies in different locations in the dwelling or structure.

In those situations where there are a limited number of colonies, say less than 5 colonies in a structure, the exterminator has the option of either tenting the complete structure and utilizing approved fumigants such as methyl bromide or in the alternative the exterminator may attack each colony separately and use locally approved techniques such as an electric gun, direct injection of poison, or even in extreme cases removal of the affected parts.

In those cases where more than 5 colonies are located in a structure, it is usually considered more expedient for the exterminator to tent the complete structure and utilize the fumigants that are presently approved.

Unfortunately tenting a structure is time-consuming, both for the owner and for the exterminator, and hence additional costs are involved. For example, a minimum of two or three days is necessary to allow the poisons to permeate through the complete structure. The owner of the dwelling and all inhabitants must of necessity vacate the premises and move to a remote location. Last but not least, the use of methyl bromide is gradually being limited by more municipalities and in fact certain countries will not allow that poison to be used at all for extermination purposes.

There is a search going on today for a less volatile poison that is more in keeping with the environment and with the needs of people in today's society. Unfortunately there is a direct conflict between the ability of a poison to function and to have it compatible with the environment. While methyl bromide is an excellent poison, it is basically incompatible with today's environment and each year there are at least two or three deaths caused to exterminating people and others who inadvertently are overcome and killed by handling or mishandling this poison. The alternative less poisonous methods being approved are not as effective and as a result the exterminators find it difficult to give a guarantee that termites have been exterminated when in fact the poisons used are not as effective as they should be. The search continues even today for an effective poison that is more compatible with our environment. Last but not least, poisons such as methyl bromide leave a residual residue that is of itself poisonous and objectionable.

In the present invention there is disclosed a method of utilizing an inert freezing liquid for killing dry wood termites and other insects that does not have the disadvantages of present-day poisons such as methyl bromide or the like.

In the preferred embodiment liquid nitrogen is used as the source material which is applied directly to the colonies of termites that are to be eliminated.

An advantage of liquid nitrogen is that nitrogen is a natural occurring element in our atmosphere which is 78% nitrogen and which forms the main building block of many plants. After the nitrogen has done its job of freezing and killing the objectionable insects, the nitrogen evaporates harmlessly in the air leaving no chemical residue as with other fumigants, thereby making it safe for workers and for the occupants of the dwelling where the nitrogen has been used.

Experimentation has verified that dry wood termites cannot survive in temperatures less than 0° F. for longer than 5 minutes. While it is true that liquid nitrogen has the capability of reducing the temperature to 300° below 0° F. it is recognized that these extreme temperatures are not required in order to freeze and kill the termites. It is believed that the termites die by freezing the body fluids within the insect. The termites will freeze and die at 0° F. in approximately 2 minutes with whole colonies being destroyed in less than 5 minutes.

It is interesting to note that dry wood termites exist only in colonies and do not exist as individual insects. It has been discovered that killing the majority of the colony will cause the death of the remaining members of the colony even though they are not specifically infected by the freezing cold of the liquid nitrogen.

The invention is concerned primarily with killing dry wood termites in inaccessible locations as well as killing those termites that are located in more accessible locations.

Another application of the inert freezing liquid is in the elimination of the infamous fire ants located in the mid-western plains. The fire ants have been tenacious and successful in preventing elimination by conventional poisons by their ability to burrow horizontally below the soil whenever threatened by conventional fumigants or poisons.

It has been discovered that many insects and small rodents and animals are very sensitive to changes in the atmosphere that would indicate danger to themselves and upon sensing the danger in the atmosphere immediately flee or burrow out of the environment as a life-saving measure.

The use of liquid nitrogen is particularly effective against these insects and rodents since nitrogen gas being part of the atmosphere in general does not trigger a threatening reaction within the animals or insects. This is extremely important since the insects or animals being exterminated do not fear the intrusion of the liquid nitrogen or the gases being evolved as the liquid nitrogen is heated and evolves into a gas state.

While it is true the insects do not have a lung system as warm blooded animals have and as a result their breathing techniques are more restricted and limited, it has been observed that the liquid nitrogen does kill through the act of freezing the bodily fluids within the insect. The mammals on the other hand are affected by the gases being evolved from the liquid nitrogen and because of the inert effect of the evolved nitrogen gas the rodents, whether they be mice, gophers or the like, are incapacitated first by the gas and then eventually killed either by the lack of oxygen and/or the freezing action of the liquid nitrogen.

Fire ants by their nature exist in colonies usually in close proximity to each other and in mounds that are readily discernible. The location of these mounds in the fields effectively prevents the farmer from utilizing the soil since tilling the soil and disrupting the mound causes a violent reaction and attack mode of the ants that has the effect of destroying and removing all wildlife from the area including the farmer.

Extermination of the fire ants is enhanced by injecting liquid nitrogen directly into the mound supporting the colony of fire ants. Sufficient liquid is inserted under pressure for a period of time to reduce the temperature in the ground around the mound of fire ants to a distance of approximately two feet and to a temperature of 0° F. The liquid nitrogen is maintained under pressure sufficient to maintain the area at 0° F. for approximately 2 to 5 minutes to thereby ensure destruction of the fire ants within the mound. Here again the ants live in colonies and killing the queen ant and the majority of the colony will usually result in the destruction of the remaining members of that colony.

The application of an inert freezing liquid and specifically liquid nitrogen is nowhere shown or suggested in any of the prior references or records available to the inventor.

The prior art has disclosed the use of heated gas as a means of destroying micro-organisms and these techniques are illustrated in U.S. Pat. No. 2,171,315 issued Aug. 29, 1939 to Ivor Rennerfelt and U.S. Pat. No. 2,114,494 issued Apr. 19, 1938 to M. E. Hummel, et al., and U.S. Pat. No. 1,948,228 issued Feb. 20, 1934 to G. P. Urban.

An interesting patent issued July 28, 1942 to W. B. Clary, et al., as U.S. Pat. No. 2,290,942 discloses the use of a conventional refrigeration device utilizing freezing air as a means of weed control on golf courses and the like. The claimed process appears to attack crab grass without destroying conventional golf greens.

Further objects and advantages of the present invention will be made more apparent by referring now to the accompanying drawings wherein.

The inventive concept concerns the use of an inert freezing liquid that not only incapacitates the breathing response of the insect or animal under test, but also kills by freezing the bodily fluids of the insect or animal itself. Death usually takes place through the freezing action as opposed to the incapacitation caused by breathing the inert liquid.

While it is true there are many inert freezing liquids that can be used, the practice of the invention will be described in connection with liquid nitrogen which is disclosed as the preferred embodiment. Liquid nitrogen is chosen because nitrogen does comprise 78% of the atmosphere and hence normal mammals do not have any defense or flight characteristics when breathing the gas evolving from the liquid nitrogen. Incapacitation due to lack of oxygen is very quick and almost spontaneous.

The liquid nitrogen is definitely preferred when dealing with small animals, however, other inert liquid gases having low boiling points at room temperatures may be used when dealing with insects such as dry wood termites or fire ants and the like.

In describing the method as taught by this invention, reference is made to organisms both in the specification and claims and when using the word organisms it is specifically inferred and defined that organisms means all insects, dry wood termites, fleas, mites, fire ants, bees, rodents, and the like.

Figure 1:
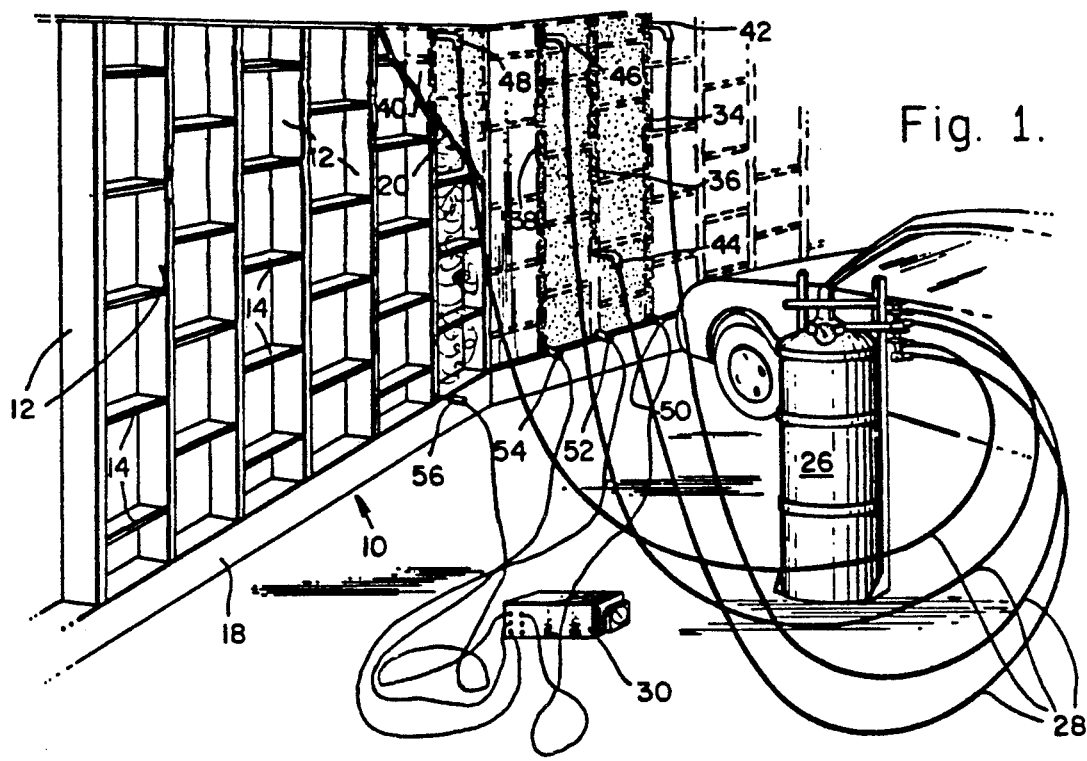
FIG. 1 illustrates the method of utilizing liquid nitrogen against dry wood termites in an enclosed and exposed area.

Referring now to FIG. 1, there is shown a walled portion of a structure 10 comprising studs 12 and a plurality of fire breaks 14. This kind of typical construction includes a header 16 and a base portion 18 with the wall portion covered by a suitable wallboard 20 usually having wallpaper on the outside surface thereof.

The wallboard 20 is shown in a cutaway portion to illustrate the basic construction found in modern structures.

The first step to any termite treatment is to locate the infestation and hence a careful inspection of the structure must be made to reveal the exact location of the infestations and the number of infestations.

There are many well known techniques used by those skilled in the art today to locate termite infestations and they include sound, trained dogs, fiber optics and visual inspections.

A careful inspection of the structure will reveal the exact location of infestations in the accessible areas of the structure and the approximate location of any inaccessible infestations.

Those areas accessible to direct attack can be treated directly, however, there are many inaccessible areas that usually cannot be treated or reached and these include inside walls within the wallboard 20 and certain inaccessible areas of the attics of modern homes.

In California the board has defined that when a live infestation is noted and the infestation borders extend into an inaccessible area, then it is assumed that the inaccessible areas have active infestations that require treatment. The only treatment available today is a total fumigation of the complete structure by approved poisons such as methyl bromide or an opening of each area where infestation has been found and that usually requires the removal of wallboards 20 and all other structures interfering with direct observation.

In the practice of the present invention it is necessary to inject liquid nitrogen directly onto the infestation or directly into the colony of dry wood termites.

Liquid nitrogen is brought to the area in a suitable tank 26 having the necessary control valves for feeding a plurality of lines 28 directly into areas of infestation.

In the practice of the invention method it is necessary to reduce the temperature to at least $-20°$ F. to ensure that all areas of infestation have been destroyed. A suitable temperature monitor 30 having a plurality of leads 32 is used to monitor the temperature of those areas where infestation has been detected.

The exterminator first locates the wood members 12 and 14 behind the wallboard 20 by suitable devices such as fiber optics. The areas of infestation are located by conventional techniques known by those skilled in the art.

If we assume for purposes of explanation that infestation is found in studs 34, 36, 38 and 40, the exterminator will drill holes through the wallboard 20 and insert nozzles 42, 44, 46 and 48 into those holes. Nozzles 42 through 48 are in turn connected to lines 28 thereby allowing nitrogen from tank 26 to be injected onto studs 34, 36, 38 and 40.

The temperature of these studs is monitored by temperature probes 50, 52, 54 and 56 that are connected through lines 32 through temperature monitoring device 30.

The operator opens the necessary valves associated with tank 26 thereby forcing liquid nitrogen onto studs 34, 36, 38 and 40 and for a period of time until temperature probe 50, 52, 54 and 56 read $-20°$ F. When $-20°$ F. is reached at the furthest point from the top the flow of nitrogen is stopped which should take approximately 30 minutes.

Experience has shown that 5 minutes at $0°$ F. will kill all dry wood termites in that area.

The process is then repeated for all areas covered by wallboards or made inaccessible by other construction techniques.

In those stud members where the studs are exposed, the operator simply injects the inert freezing liquid directly and the stud member determined to have the colony of termites and for the time period mentioned above.

The main concept is to put the liquid directly onto the wood that is to be treated. Gravity will govern the flow of the liquid thereby dictating that the inlet holes be placed higher than the detected infestations.

Attics and sub-areas and top plates can be similarly treated by using a spray nozzle that allows the operator to spray the wood directly, thereby reducing the temperature of the wood for the time required.

In utilizing the defined method the inlet holes can be placed on the inside walls or from the outside walls, whichever is more convenient for the operator, inspector or customer. The process requires the releasing of cold inert freezing liquid into the treatment areas and at a rate that does no damage to the materials. In this regard it is recommended that the minimum pressure be used consistent with obtaining a $0°$ F. temperature in order to prevent thermal shock to the surrounding environment in contact with the liquid nitrogen.

Experience has shown that uninsulated walls will take approximately 40 minutes for the temperature to decrease to $-20°$ F. when using minimum pressure. Those covered walls having internal insulation will usually take much less since the insulation will be a thermal barrier and prevent heat loss of the cold through the barrier. An insulated wall will use half the liquid nitrogen and reach the desired temperature in half the time of an uninsulated wall. There is usually very little temperature loss through adjoining studs.

Interestingly, there is no moisture collected on the inside walls when applying the liquid nitrogen due to the absence of moisture. There will be moisture accumulation on the outside walls since the wallboard or wall covering will become cold and cause condensation of moisture in the room to adhere to the wall itself. This amount of moisture appearing on the outside wall is small and should be of no consequence.

The process is completed for all areas of found infestation thereby effectively destroying the termite colonies with a minimum of inconvenience to the customer.

When finished, closing the valves associated with nitrogen tank 26 allows the accumulated liquid nitrogen within the studs to gradually boil off as the temperature rises thereby again placing the nitrogen in a gaseous form in the atmosphere without harm to the occupants or to the operators. There is of course no residual effect from the liquid nitrogen and hence there is no contamination with food or other edible materials that may be located within the room being treated.

The problems associated with thermal shock must be understood when dealing with any inert freezing liquid such as nitrogen. The problem is not the low temperature but, rather, the rate at which the temperature is reduced when liquid nitrogen is introduced into the stud area. The problem that occur when things are heated or cooled too fast is generally identified as thermal shock and occurs when one portion of the material expands at a different rate than another portion, thereby resulting in a breakage or destruction of the material.

All materials except water contract when cold. Water, on the other hand, expands. All problems associated with thermal shock are solvable by applying the cold liquid at a slow rate. The approved rate is gauged by placing a temperature probe approximately 10 inches from the entry source of the liquid nitrogen. The probe must be placed so as not to receive any direct contact with the liquid and by keeping the air temperature between $-120$ to $-150$ degrees Fahrenheit difference between the applied temperature of the walls and the outside temperature in order to stay below the thermal shock point of plaster and dry wall which is the most fragile material used in making up the wallboard. It is the temperature difference that should be monitored continuously since liquid nitrogen does have the capability of reducing the temperature of the dry wall to minus 300 degrees below zero Fahrenheit.

The wall construction illustrated in FIG. 1 is only a representative example of modern construction, however, in many old homes there are diagonal braces that should be accounted for and located by the exterminator when inserting the liquid nitrogen.

As mentioned previously, moisture is present on the outside of the wall because the wall becomes colder than the air it is in contact with, thereby causing the moisture in the air to condense and collect on the outside of the wall. Since the wall is below the freezing point of water, the moisture will collect on the wall and appear as snow and as the wall warms after the process is over the snow will melt and the water rolls off or evaporates. This condensation of snow can be used by the exterminator as a guide of where the liquid nitrogen is penetrating within the stud being treated and hence becomes a visual indicator of the effectiveness of the penetration of the liquid nitrogen. As mentioned previously, there is no condensation on the inside of the wall in contact with the wall liquid nitrogen since liquid nitrogen does not have any moisture to condense.

Figure 2:
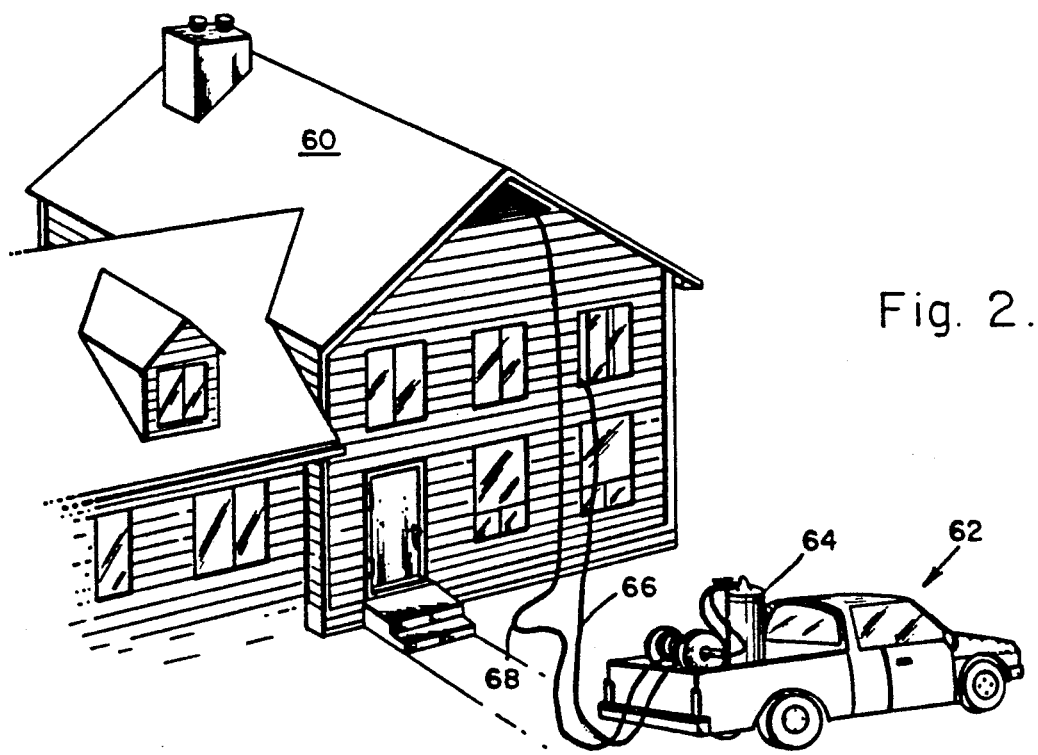
FIG. 2 illustrates the method of utilizing a portable supply of liquid nitrogen for use in a structure.

Referring now to FIG. 2, there is shown a dwelling house 60 and a supply vehicle 62 having the capability of delivering a tank of nitrogen 64 to the home site. Suitable lines 66 connected to the tank 64 are used to inject the liquid nitrogen the stud structure of the dwellinghouse 60 and from the outside.

Figure 3:
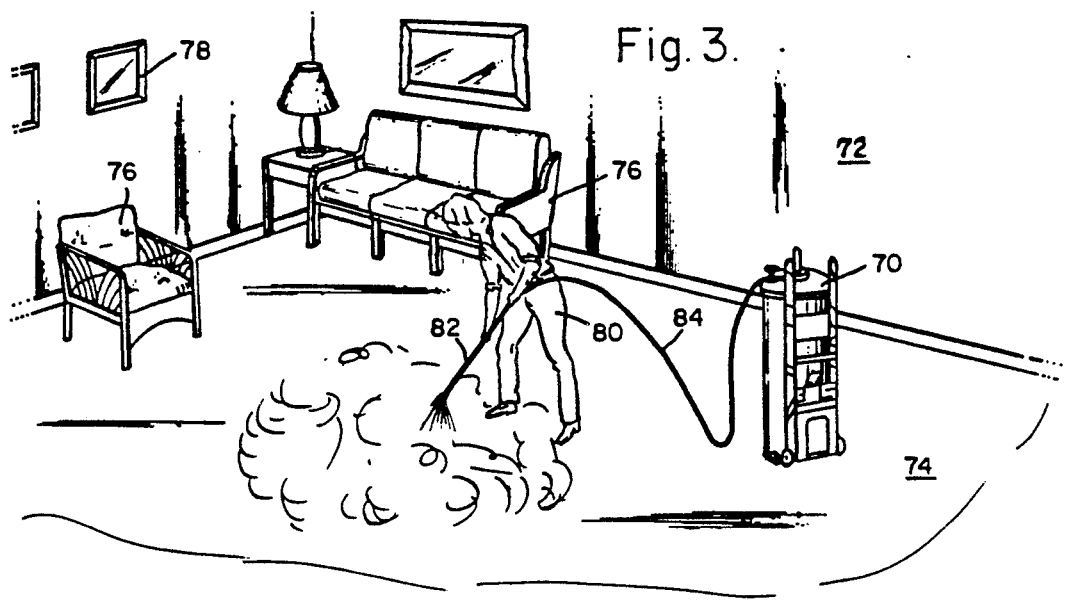
FIG. 3 illustrates the method of utilizing liquid nitrogen to destroy fleas in a room.

Referring now to FIG. 3, there is shown an application of utilizing liquid nitrogen from a tank 70 located within a room 72 having a rug 74, furniture 76 and pictures 78.

An operator 80 holding a nozzle 82 connected via a line 84 to the source of nitrogen 70 causes the release of the liquid nitrogen onto the rug 74. The operator 80 continues the process in a moving relationship until the complete rug 74 is covered with liquid nitrogen and the temperature is reduced to −150° to −250° F.

In this fashion all fleas, mites and insects located on the rug 74 will be exterminated and when the source of nitrogen is removed the liquid will evaporate, leaving no residue or objectionable odor in the room 72.

The use of an inert freezing liquid such as nitrogen has wide applicability towards the elimination and destruction of fire ants in the ground.

Fire ants by their nature live in mounds that vary from a height of approximately 3 inches to a height of 3 feet and have a diameter that may vary from 6 inches to maybe 3 feet. The fire ants live in colonies dominated by a queen ant. The so-called fire ant is particularly hostile when disturbed and in many parts of the country these ants have taken over farmland, thereby preventing the farmer from utilizing the land for crops or other more productive uses.

Figure 4:
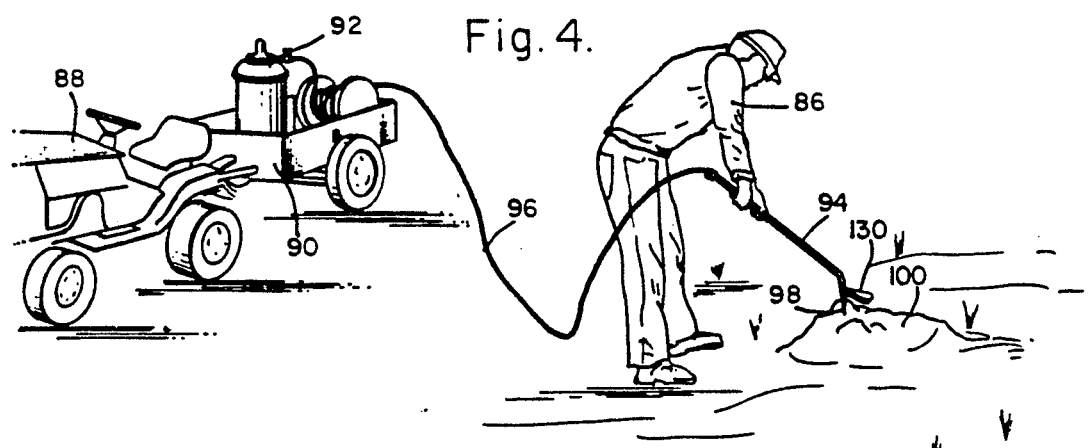
FIG. 4 illustrates a method of applying liquid nitrogen to eradicate fire ants.

Referring now to FIG. 4, there is illustrated an application describing a method for the removal and elimination of fire ants.

The farmer 86 utilizes conventional farm equipment such as a tractor 88 to haul a trailer 90 containing a supply of liquid nitrogen in container 92. A suitable probe 94 operated by the farmer 86 is connected by means of a hose 96 to the tank 92.

The farmer manipulates the probe 94 by inserting the end 98 into the center of the ant mound 100 and to a depth of approximately three feet.

Liquid nitrogen is then inserted from the tip 98 of the probe 94 and into the mound 100 at such a rate and for such a volume until the ground temperature measured approximately one to two feet from the probe 98 has a measurable temperature of at least 0° F. The flow rate is continued for approximately 2 to 5 minutes to thereby ensure that all ants within the mound 100 have been completely enveloped by the freezing temperature produced by the liquid nitrogen from tank 92.

Figure 5:
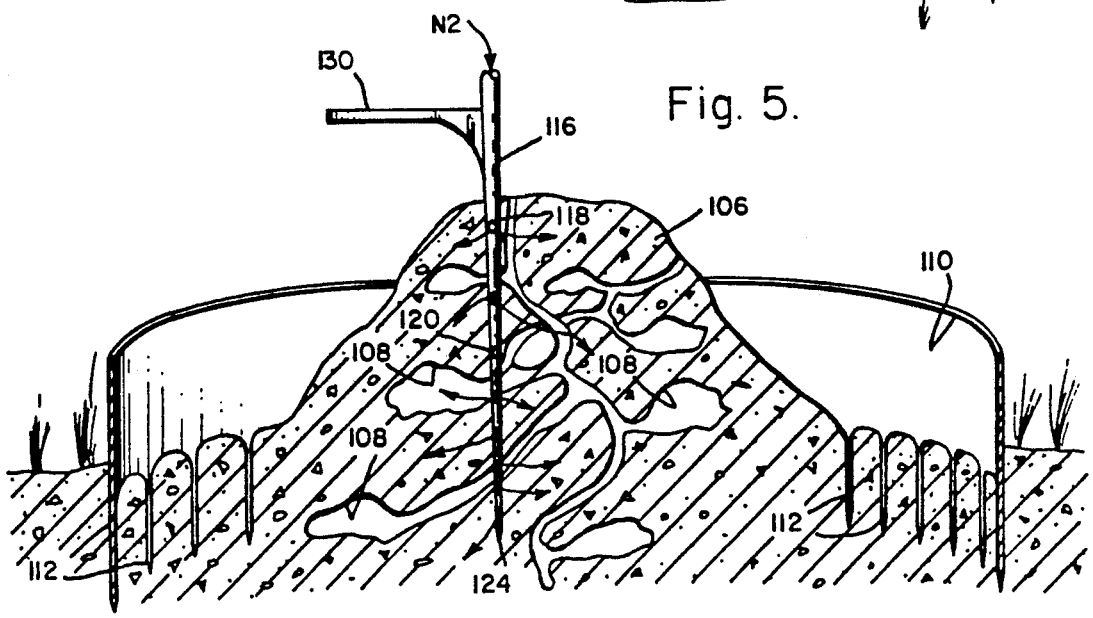
FIG. 5 is a cross-sectional view illustrating a probe of liquid nitrogen inserted within a mound comprised of fire ants.

Referring now to FIG. 5, there is shown in more detail a cross-sectional view of an ant mound 106 containing a plurality of basically horizontal passages 108 used by the ants as they travel within the mound. Experiments have shown that the fire ants move horizontally within the mound and have the ability to tunnel for at least one to two feet below the surface.

The fire ants are believed to be a colonizing ant and live in colonies very similar to dry wood termites and it is believed that killing the queen and at least 50% of the colony will result in the death of the complete colony. Those stragglers not killed initially by the introduction of the liquid nitrogen should perish without the queen.

FIG. 5 also shows the use of a cylindrical ring 110 having a diameter of approximately three feet and containing prongs 112 that are inserted into the ground circumferentially about the mound 106. The ring 110 is inserted at least a foot in the ground and has the effect of preventing horizontal movement of escaping ants to thereby ensure the death of those ants within the mound by the insertion of the liquid nitrogen.

A probe 116 contains a plurality of ports 118, 120, 122 and a bottommost port 124 which allow the liquid nitrogen entering the probe 116 to be expelled from the probe and into the mound 106 at different levels, thereby improving the chance of killing the fire ants and the queen by freezing. A shoulder 130 attached to the probe 116 is used by the farmer as a foot assist to help insert the probe into the center of the mound 106 before applying the liquid nitrogen.

The method of killing fire ants in the field as illustrated in connection with FIGS. 4 and 5 are shown by way of example only since it is envisioned that in the practical application more than one hose would be connected to the supply of nitrogen, thereby allowing the farmer to force the liquid nitrogen into a plurality of mounds thereby allowing the farmer to treat as many mounds at one time as he has hoses connected to the tank.

The actual rate of flow and pressure used will be a function of the soil conditions and the vapor conditions existing in the soil. A flow rate sufficient to reduce the temperature to a freezing level of 0° F., which temperature can be maintained for 2 to 5 minutes, is all that is necessary to kill the fire ants.

It is recommended very strongly that the lowest pressure capable of achieving this end be used consistent with soil conditions in order to prevent material loss to the soil and to the surrounding environment. In other words, a pressure of liquid nitrogen sufficient to freeze the soil to a temperature of 0° F. should take approximately 2 to 5 minutes in order to ensure the death and extermination of ants under attack.

The size of the individual mounds will also indicate to the farmer the size of probe that should be used when injecting the liquid nitrogen. For example, a small probe having a length of approximately 6 inches could be used where the height of the mound above the ground is approximately 3 inches; however, for a larger mound existing upwards of 12 inches, then it is recommended that a probe approximately 2 feet in length should be used to thereby ensure that fire ants at all levels within the mound are frozen and exterminated.

In all cases when using liquid nitrogen as the freezing and killing agent, it is strongly recommended that the minimum pressure necessary to achieve the killing temperature of 0° F. be used as a means of reducing thermal shock to the materials.

It is also recognized that in order to ensure that all dry wood termites, fire ants or the like have been killed, that in certain circumstances it may be necessary to drive the temperature of the environment to a temperature below freezing such as −50° F. or even −100° F. by using the liquid nitrogen for a longer period of time. This condition should result in what been termed an overkill situation and should guarantee to the user that all mites, termites, organisms, rodents, fleas, roaches, ants and the like have been killed. The excess nitrogen needed to obtain these lower temperatures below freezing is quite minimal and may be preferred for certain applications.

I claim:

1. A use of cryogenic liquid for treating an infested wall including a wooden member and a wall panel, wherein said treating is accomplished by locating a colony of drywood termites in the wooden member; forming a hole in said wall panel above said colony adjacent to said wooden member; inserting nozzle means through said hole; applying cold fluid under pressure through said nozzle means to the surface of said wooden member; and permitting said fluid to flow under the force of gravity downwardly along the surface of said wooden member to reduce the temperature of the wooden member sufficiently to cause the extermination of the termites; wherein said treating is accomplished at a liquid pressure sufficient to prevent thermal shock to a wall panel when applied thereto for treatment purposes and wherein said liquid reduces the temperature of said wall to a temperature at or below about 0° F.

2. A use of claim 1 wherein said wall temperature is maintained for about 5 minutes.

3. A use according to claim 1, in which said cryogenic liquid is kept in contact with said member for at least five minutes at zero degrees Fahrenheit.

4. A use according to claim 1, in which said cryogenic liquid is liquid nitrogen introduced at low pressure to reduce thermal shock to the surrounding environment.

5. A method according to claim 1, in which said inert freezing liquid is injected into the center of the colony of organisms thereby enveloping and destroying the majority of the colony of organisms.

* * * * *